United States Patent Office 3,814,767
Patented June 4, 1974

3,814,767
PROCESS FOR PREPARING BICYCLO ALKYL DERIVATIVES
Frederick Edmund Ward, Elkhart, Ind., assignor to Miles Laboratories, Inc., Elkhart, Ind.
No Drawing. Filed Apr. 7, 1972, Ser. No. 242,227
Int. Cl. C07d 51/70
U.S. Cl. 260—268 BC    1 Claim

ABSTRACT OF THE DISCLOSURE

A process for the synthesis of bicyclo alkyl derivatives of the structural formula:

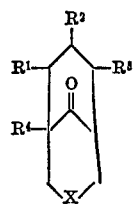

in which $R^1$ is H or phenyl, $R^2$ is H or alkyl, $R^4$ is H, phenyl or substituted phenyl in which the substituents are halogen, alkoxy, or alkyl, $R^5$ is

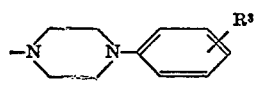

or

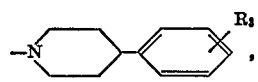

$R^3$ is H, halogen, alkoxy or $CF^3$, and X is a polycarbon lower alkylene radical of between 0 and 2 carbon atoms inclusive, comprising the following reaction sequence:

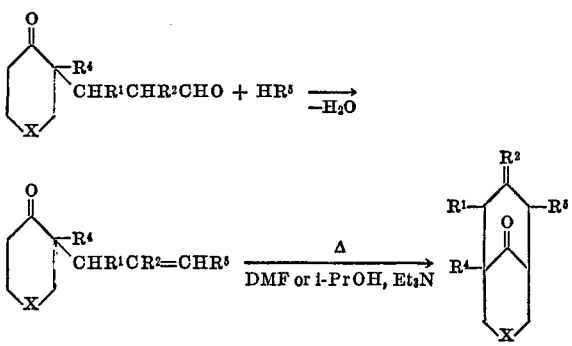

The compounds prepared according to the process of this invention have beneficial pharmacological properties.

BACKGROUND OF THE INVENTION

This invention relates to the synthesis of bicyclo alkyl derivatives having beneficial pharmacological properties.

In U.S. Pat. No. 3,309,370, issued Mar. 14, 1967 to Robert Norman Schut and assigned to the instant assignee, a process is described for synthesizing certain bicyclo alkyl piperazine derivatives corresponding to some of the compounds prepared by the novel process of this invention. Although the process described in U.S. Pat. No. 3,309,370 was suitable for preparing a number of bicyclo alkyl products, such process did not permit the preparation of a compound substituted at the bridge position.

SUMMARY OF THE INVENTION

Accordingly, it is an object of this invention to provide a novel process for synthesizing bicyclo alkyl derivatives substituted at the bridge position.

Another object of this invention is to provide novel bicyclo alkyl derivatives substituted at the bridge position.

A further object of this invention is to provide a novel process for synthesizing desirable bicyclo alkyl derivatives with readily available reactants such that there is a satisfactory overall yield.

Other objects and advantages of this invention will become apparent from the following description.

This invention is embodied in a process for preparing bicyclo alkyl derivatives according to the following process:

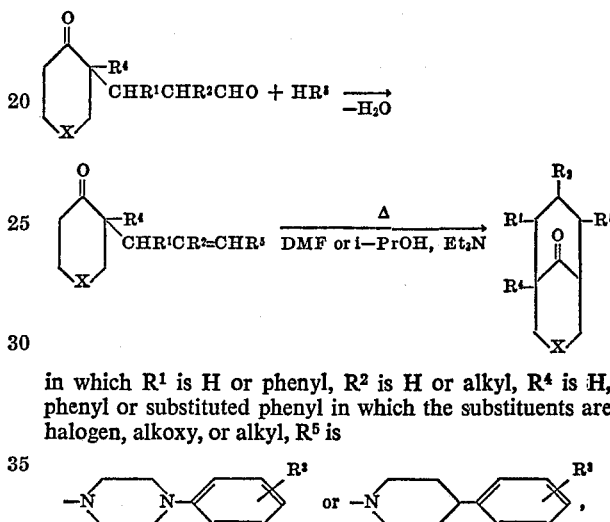

in which $R^1$ is H or phenyl, $R^2$ is H or alkyl, $R^4$ is H, phenyl or substituted phenyl in which the substituents are halogen, alkoxy, or alkyl, $R^5$ is

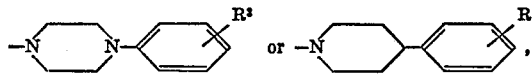

$R^3$ is H, halogen, alkoxy or $CF^3$ and X is a polycarbon lower alkylene radical of between 0 and 2 carbon atoms inclusive.

This invention is also embodied in a novel group of bicyclo alkyl derivatives that are substituted at the bridge position and more particularly at the 5 position of the compound. In the novel compounds of this invention the radical $R^4$, as previously defined, is other than H.

The starting compound used in the novel reaction of this invention may be prepared by reacting a suitable cycloalkanone with acrolein under basic conditions to yield a 2-propanal cycloalkanone. The 2-propanal cycloalkanone is reacted with a desirable amine to form an enamine which is subsequently reacted in a cyclization step in the presence of DMF (dimethylformamide) or i-PrOH and triethylamine to form the desired compounds.

The propanal is preferably formed by combining the reactants under an inert atmosphere, such as nitrogen, and maintaining the temperature substantially below the reflux temperature. The combined reactants are preferably stirred for a period of time adequate to permit substantial completion of the reaction.

The propanal is then combined with the preselected amine in a suitable solvent, such as toluene or benzene and heated under reflux for a period of time sufficient to permit the removal of the theoretical amount of $H_2O$. This $H_2O$ may be readily collected and measured in a Dean-Starke trap.

The desired product is then formed by heating the enamine prepared in the previous step in the presence of the DMF or i-PrOH and triethylamine. This reaction is advantageously carried out at temperature between about 60° C. and 150° C. with stirring for period of about 6 to 24 hours or longer.

The radicals alkyl and alkoxy, as used in this invention, refer generally to lower alkyl and lower alkoxy each having between about 1 and 5 carbon atoms inclusive. The halogen is beneficially selected from chlorine or bromine and may be chosen from other common halogens.

It will be recognized that suitable pharmacologically acceptable salts may be readily formed from these compounds according to well known procedures. The preparation of a hydrochloride salt is set forth in Example 1. The preparation of other acceptable salts, such as those formed from other mineral acids, and organic acids, such as citric acid, maleic acid, oxalic acid and the like, may be accomplished in a similar manner.

It has been determined that compounds prepared according to the novel process of this invention have beneficial pharmacological activity. In U.S. Pat. No. 3,309,370 it was established that these compounds possess activity as anti-inflammatory and analgetic agents. Further, it has been observed that the compounds substituted at the bridge position have activity as tranquilizing agents.

The invention will be further described in the following examples which illustrate the preparation of specific compounds. This invention is not to be construed as limited in scope by these examples, as it will be apparent that numerous other compounds, such as those disclosed in U.S. Pat. 3,309,370, may be similarly prepared with this novel process without departing from the invention.

DESCRIPTION OF THE PREFERRED EMBODIMENTS

EXAMPLE 1

2-(4-phenyl-1-piperazyl)-5-phenylbicyclo[3.3.1]nonane-9-one·HCl

A. 3-(1 - phenyl - 2 - oxocyclohex - 1 - yl)propionaldehyde: To a solution of 38.0 g. (0.21 mole) of 2-phenylcyclohexanone in 200 ml. of $Et_2O$ at 10° C. under an $N_2$ atmosphere 3 drops of benzyltrimethylammonium hydroxide (40% in MeOH) was added, followed by dropwise addition of 16.8 g. (0.30 mole) of acrolein in 50 ml. of $Et_2O$. The reaction temperature was not allowed to rise above 35° C. during the addition. After 2 hours of stirring, the solvent was removed in vacuo and the residue distilled. A fraction (9.4 g.) with a boiling point of 135–140° C. (0.1 mm.) was a mixture of the desired aldehyde and the isomeric 2 - hydroxy - 5 - phenylbicyclo[3.3.1]nonan-9-one; I.R. ($CHCl_3$) 3400 (OH), 2720 (CHO), 1725 (C=O, aldehyde) and 1710 (C=O, ketone) cm.$^{-1}$; NMR ($CHCl_3$) 8.75 (t, 0.5, CHO); the benzylic proton signal at 3.5 for 2-phenylcyclohexanone was absent.

B. 3(1-phenyl - 2 - oxocyclohex - 1 - yl)-1-(4-phenyl-1-piperazyl)propene: A solution of 8.0 g. (0.034 mole) of compound A and 6.5 g. (0.040 mole) of 1-phenylpiperazine in 100 ml. of toluene was heated under reflux for 3 hours during which time the theoretical amount of $H_2O$ was collected in a Dean-Starke trap. Removal of solvent in vacuo gave 12.5 g. of the enamine as a redbrown oil; I.R. ($CHCl_3$) 1715 (C=O, ketone), 1650

(N—C=C)

cm.$^{-1}$.

C. 2-(4 - phenyl - 1 - piperazyl)-5-phenylbicyclo[3.3.1]nonane-9-one·HCl: Compound B in 40 ml. of DMF and 10 ml. of triethylamine was stirred at 80° C. for 1 day. After removal of the solvent, the residue was stirred in 150 ml. $Et_2O$-5% aqueous HCl (2:1) for 18 hours. The hydrochloride was collected and recrystallized from MeOH yield 0.6 g.; M.P. 198–200° C.;

$\nu_{max.}^{KCl}$ 1715 cm.$^{-1}$

Analysis.—Calcd. for $C_{25}H_{30}N_2O·HCl$: C, 73.05; H, 7.60; N, 6.82. Found: C, 72.62; H, 7.65; N, 6.56.

EXAMPLE 2

2-(4-phenyl-1-piperazyl)bicyclo[3.3.1]nonan-9-one

A. 3-(2-oxocyclohex - 1 - yl) - 1 - (4-phenyl-1-piperazyl)propene: A mixture of 3-(2-oxocyclohex-1-yl)propionaldehyde (15.4 g.; 0.1 mole), 1 - phenylpiperazine (16.2 g.; 0.1 mole) and toluene (100 ml.) was refluxed and the water collected in a Dean-Starke trap. The theoretical amount of $H_2O$ was collected after 4 hours. The solvent was removed in vaco. The residue was characterized by means of its I.R. spectrum.

$\nu_{max.}^{CHCl_3}$ 1700 cm.$^{-1}$ (C=O ketone); 1655 (C=C—N<enamine) and no absorption due to the aldehyde C=O.

B. 2-(4-phenyl - 1 - piperazyl)bicyclo[3.3.1]nonan-9-one: Compound A was rearranged by heating at 80° C. in a mixture of DMF (80 ml.) and triethylamine (20 ml.) for 24 hours. The equatorial amine was isolated by removing the solvent in vacuo, dissolving the residue in 400 ml. of 10% hydrochloric acid, washing the acid solution with $CHCl_3$ to remove neutral impurities and making basic with $NH_4OH$. The amine precipitated and was collected by filtration. The solid was recrystallized from methanol to give 4 g., M.P. 122–124° C. The solid was identified as the expected product by virtue of its infrared spectrum which was superimposable on that of an authentic sample prepared by another route.

EXAMPLE 3

Pharmacology

Graduated doses of the compound of Example 1 were administered intraperitoneally to mice. Tranquilizing activity was observed as evidenced by sedation which resulted at a dose of 30 ml. per kg. as judged by the reduced spontaneous motor activity of the mice. This effect was regarded as specific since at this dose muscular coordination and exploratory activity were not affected.

What is claimed is:

1. A process for preparation of a compound of the structural formula:

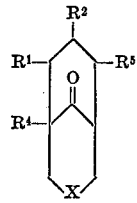

in which $R^1$ is H or phenyl, $R^2$ is H or lower alkyl of between 1 and 5 carbon atoms inclusive, $R^4$ is H, phenyl or substituted phenyl in which the substituents are halogen, lower alkoxy of between 1 and 5 carbon atoms inclusive, or lower alkyl of between 1 and 5 carbon atoms inclusive, $R^5$ is:

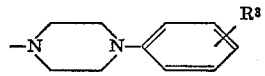

or

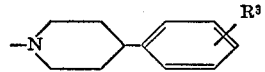

$R^3$ is H, halogen, lower alkoxy of between 1 and 5 carbon atoms or $CF^3$, and X is a polycarbon lower alkylene of between 0 and 2 carbon atoms inclusive, the process consisting essentially of combining as a reaction mixture a compound of the formula:

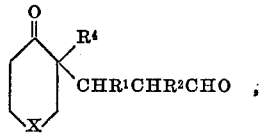

with an amine of the formula: $HR^5$ while removing water from the reaction mixture to form an enamine of the formula:

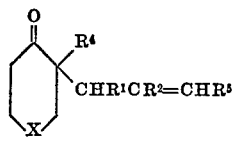

heating the enamine in a solution of triethylamine and a compound selected from the group consisting of DMF and i-PrOH and separating from the solution the desired compound.

References Cited
UNITED STATES PATENTS

| | | | |
|---|---|---|---|
| 3,108,998 | 10/1963 | Poos | 260—268 BC |
| 3,502,669 | 3/1970 | Nakamshi | 260—268 BC |
| 3,716,538 | 2/1973 | Schut | 260—268 BC |

DONALD G. DAUS, Primary Examiner

U.S. Cl. X.R.

260—240 R, 293.56, 598